United States Patent
Persall

(10) Patent No.: US 6,918,809 B2
(45) Date of Patent: Jul. 19, 2005

(54) MULTIPURPOSE DISC TOY

(76) Inventor: Stanley Edwin Persall, 18 Woodhouse Ave., Port Dover, Ontario (CA), N0A 1N8

( * ) Notice: Subject to any disclaimer, the term of this patent is extended or adjusted under 35 U.S.C. 154(b) by 161 days.

(21) Appl. No.: 10/068,048

(22) Filed: Feb. 8, 2002

(65) Prior Publication Data

US 2003/0096554 A1 May 22, 2003

(30) Foreign Application Priority Data

Feb. 16, 2001 (CA) .............................................. 2337465

(51) Int. Cl.⁷ .............................................. A63H 27/00
(52) U.S. Cl. ......................................... 446/46; 119/707
(58) Field of Search .............................. 446/46, 47, 48; 119/61, 707, 709, 710, 711

(56) References Cited

U.S. PATENT DOCUMENTS

| | | | |
|---|---|---|---|
| 2,610,851 A | | 9/1952 | Jones |
| 3,135,173 A | | 6/1964 | Jack, Jr. |
| 3,359,678 A | * | 12/1967 | Headrick |
| 3,724,122 A | * | 4/1973 | Gillespie, Sr. |
| 3,879,491 A | | 4/1975 | Lindsey et al. |
| 4,077,155 A | | 3/1978 | Bruntmyer |
| 4,121,131 A | | 10/1978 | Van Esdonk et al. |
| 4,212,131 A | * | 7/1980 | Ross, Jr. |
| 4,246,720 A | | 1/1981 | Stone |
| 4,253,572 A | | 3/1981 | Halbich |
| 4,253,672 A | * | 3/1981 | Milzoff et al. |
| 4,513,014 A | | 4/1985 | Edwards |
| 4,557,219 A | | 12/1985 | Edwards |
| 4,802,444 A | | 2/1989 | Markham et al. |
| 4,919,083 A | * | 4/1990 | Axelrod ........................ 119/29 |
| 4,979,922 A | * | 12/1990 | Clark ........................... 446/46 |
| 5,078,637 A | | 1/1992 | McFarland |
| 5,261,846 A | | 11/1993 | Hanna |
| 5,263,436 A | | 11/1993 | Axelrod |
| 5,277,641 A | * | 1/1994 | Gable et al. ................... 446/46 |
| 5,329,881 A | | 7/1994 | O'Rourke |
| 5,340,347 A | | 8/1994 | Yenerich |
| 5,480,334 A | * | 1/1996 | Wilson et al. ................. 446/46 |
| 5,484,159 A | * | 1/1996 | Dean et al. ................... 273/424 |
| 5,531,624 A | | 7/1996 | Dunipace |
| 5,540,610 A | * | 7/1996 | Sneddon ....................... 446/46 |
| D377,199 S | * | 1/1997 | Vermy ......................... D21/86 |
| 5,609,913 A | | 3/1997 | Welch |
| 5,649,875 A | | 7/1997 | Spector |
| 5,711,254 A | | 1/1998 | O'Rourke |
| 5,750,196 A | | 5/1998 | Welch |
| D414,823 S | * | 10/1999 | Gardner ...................... D21/443 |
| 6,073,588 A | | 6/2000 | McClung, III et al. |
| 6,089,938 A | | 7/2000 | Spector |
| 6,174,214 B1 | * | 1/2001 | Cooper ......................... 446/46 |
| 6,383,052 B1 | * | 5/2002 | McCarthy ..................... 446/153 |

* cited by examiner

*Primary Examiner*—Derris H. Banks
*Assistant Examiner*—Ali Abdelwahed
(74) *Attorney, Agent, or Firm*—Eugene J. A. Gierczak

(57) ABSTRACT

A multipurpose disc useful as a throw, tug, and chew toy for play involving pets and for play involving pets and people, and useful as a water and food dish for pets, the disc comprising: a circular top portion; an annular sidewall portion that merges with the circular top portion; an annular flange portion that merges with the annular sidewall portion, the annular flange and circular top portions being disposed in parallel spaced planes; a convex outer side; and, a concave inner side. The multipurpose disc has a flat top, annularly depressed trough formed in the annular flange, an internal flexible woven fabric re-enforcing member, and is composed of a resilient, waterproof, durable, and flexible material such as natural or synthetic rubber.

17 Claims, 3 Drawing Sheets

MULTIPURPOSE DISC TOY

The invention relates to the field of pet toys. More specifically, the invention relates to a multipurpose disc toy for pet animals including dogs.

BACKGROUND OF THE INVENTION

Toys for animals including dogs are well known. These toys take on a variety of shapes and sizes and are often designed for a specific game or exercise. For example, U.S. Pat. No. 4,919,083 (Axelrod) describes a throwable pet toy in the shape of a flying disc or saucer that is impregnated with a meat based substance that is attractive to dogs. This patent describes the popular exercise and game of "playing fetch" and relates the belief of many dog trainers and breeders that retrieving is a healthy and beneficial exercise for a pet dog. Similarly, U.S. Pat. No. 6,073,588 (McClung et al.) describes a "throwing plate" game in which a flying disc or similar article includes a recess into which a pet treat or reward is placed. And, U.S. Pat. No. 5,261,846 (Hanna) and 5,078,637 (Mc Farland) both disclose flexible flying discs having a softer tube and fabric construction. All of these pet toys are optimized for various throwing games.

Flying disc or saucer shaped toys for games between humans are, of course, well known. The most famous may be the FRISBEE™ throw toy. Recently, a flexible waterproof embodiment of such a flying disc was described in U.S. Pat. No. 6,174,214 (Cooper). Flying discs of the traditional more rigid design are disclosed in U.S. Pat. No. 5,340,347 (Yenerich), U.S. Pat. No. 5,531,624 (Dunipace), U.S. Pat. No. 4,246,720 (Stone), U.S. Pat. No. 4,077,155 (Bruntmyer), U.S. Pat. No. 3,724,122 (Gillespie), and U.S. Pat. No. 3,359,678 (Headrick). However, these toys, being generally constructed on a rigid form of plastic, when used in play with pet dogs may cause damage to the pet's mouth. This is especially so if such toys are used in "tug-o-war" like games with pets. Such a game would commonly involve a playful, yet aggressive, contest be between a person and pet wherein each would grasp an opposite end of the toy and tug or pull thereon. While U.S. Pat. No. 5,261,846 (Hanna) and 5,078,637 (McFarlamd), as discussed above, disclose flying discs constructed of softer materials, they are not suited for aggressive togging games withw animals.

Tugging, and indeed chewing or gnawing, on suitable articles is commonly known to be of benefit to pet animals, especially to pet dogs. Such chewing and gnawing is beneficial to a dog's oral health as it strengthens and exercises the animal's teeth and jaws. The chewing and gnawing action tends to scrape tartar, plaque, and debris from the animal's teeth. To address this need, several pet toys specifically designed for chewing or gnawing by pet dogs have been disclosed. To protect a dog's several of these toys are made of resilient rubber-like materials. For example, U.S. Pat. No. 2,610,851 (Jones) describes a pipe shaped dog's toy molded or rubber. In fact, U.S. Pat. No. 5,750,196 (Welch), and U.S. Pat. No. 5,609,913 (Welch), describes a process for making animal chew toys out of used tire sidewalls. Further pet toy examples include the dog chew toy made in the form of a length of rope impregnated with a therapeutic dental agent of U.S. Pat. No. 5,329,881 (O'Rourke) And U.S. Pat. No. 5,711,254 (O'Rourke); the bone shaped therapeutic device for dogs made from a hard, tough material with protruding spikes of U.S. Pat. No. 5,263,436 (Axelrod); the therapeutic pet toy with an elastomer body and grooves sized for receiving a dog's teeth of U.S. Pat. No. 4,802,444 (Markham, et al.); and the chewable animal toy made from a super-tough molded elastomeric polyurethane material with a surface-migrating flavoring material of U.S. Pat. No. 4,557,219 (Edwards) and U.S. Pat. No. 4,513,014 (Edwards). However, these chewing and gnawing toys are not generally optimized for throwing games. The need therefore exists for a pet toy that is designed for use as a throw, tug and chew toy.

At the conclusion of or during a session of play with pet, the pet may become thirsty or hungry. If the play session or game is conducted outdoors, it is likely that the pet's master will not have access to a convenient means of contenting the pet with food or water. As play with pet animals is often spontaneous in nature, it would be helpful if the pet toy used in such play could also be used as an effective pet food or water dish. U.S. Pat. No. 5,078,637 (McFarland), mentioned above, contemplates the use of the flexible flying disk that it discloses as a water dish for a thirsty pet. However, the highly flexible, dome shaped, and shallow nature of the convex side of the McFarland flying disk, not being flat or deep, is not stable and not effectively suited for use as a water and food dish.

SUMMARY OF THE INVENTION

The invention provides a multi-purpose pet toy that may be used in throwing, tugging, and chewing games and exercises and which may also be used as an effective food and water dish. According to one aspect of the invention, a multi-purpose disc is provided that has a circular flat top, an annular sidewall, an annular flange, and an internal re-enforcing member. According to another aspect of the invention, a multi-purpose disc is provided that is generally formed from a resilient rubber-like material and that is optimized for use as a throwing, tugging, and chewing toy for pets. According to a further aspect of the invention, a multi-purpose disc is provided which may be used, when inverted, as an effective water or food dish for a pet.

BRIEF DESCRIPTION OF THE DRAWINGS

The invention may best be understood by referring to the following description and accompanying drawings which illustrate the invention. In the drawings.

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known materials, structures and techniques have not been described or shown in detail in order not to obscure the invention. The term rubber is used herein to be broadly construed to include natural rubber as well as synthetic compounds that can be used in pet toys as a substitution or adjunct to rubber.

The invention provides a multi-purpose pet toy that may be used in throwing, tugging, and chewing games and exercises and which may also be used as an effective food and water dish. According to another aspect of the invention, a multi-purpose disc is provided that has a circular flat top, an annular sidewall, an annular flange, and an internal re-enforcing member. According to another aspect of the invention, multi-purpose disc is provided that is generally formed from a resilient rubber-like material and that is optimized for use as a throwing, tugging, and chewing toy for pets. According to a further aspect of the invention, a multi-purpose disc is provided which may be used, when inverted, as an effective water or food dish for a pet.

Figure 1:
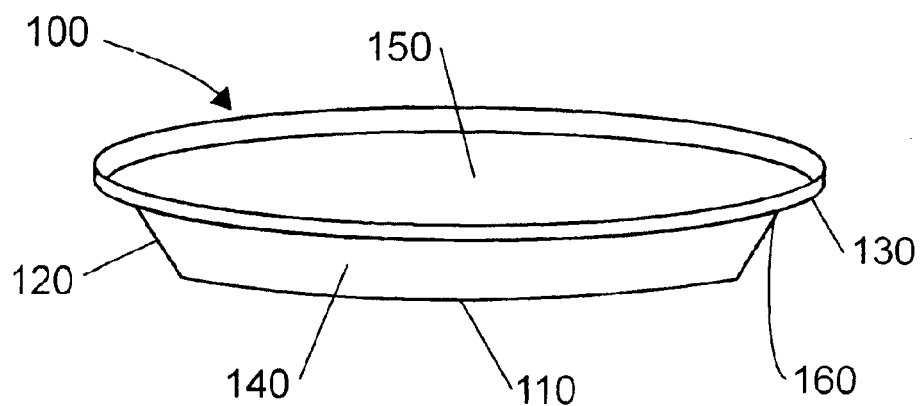
FIG. 1 is a perspective view of a multi-purpose pet toy in accordance with the preferred embodiment.

FIG. 1 is a perspective view of a multi-purpose pet toy 100 in accordance with the preferred embodiment. The pet toy 100 has a circular disc-like, saucer-like, or inverted pie platter-like shape. The pet toy 100 has a flat top portion 110. The flat top portion 110 merges with an annular sidewall portion 120 which in turn terminates in a flange portion 130. In general, the pet toy 100 has a convex outer side 140 and a concave inner side 150. The flange portion 130 has an annularly depressed trough 160 where it meets the annular sidewall portion 120 on the convex outer side 140. The preferred embodiment of the pet toy 100 has a mass of approximately 5 ounces and a diameter of approximately 8 inches. Larger and smaller versions of the pet toy 100 are also contemplated having proportional mass and dimensional characteristics.

Figure 2:
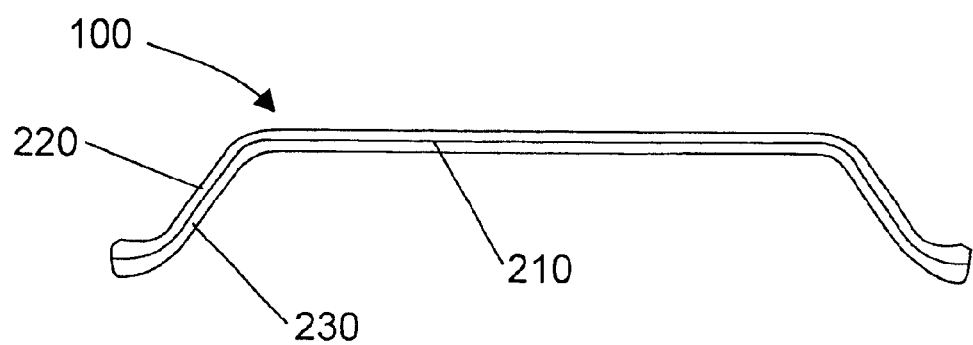
FIG. 2 is a side sectional view, taken along a diameter, of a multi-purpose pet toy in accordance with the preferred embodiment.

Referring to FIG. 2, the pet toy 100 is made of a rubber-like material. Within the rubber-like material of the pet toy 100 is reinforcing member 210 which is made of thread or cordlike fabric. The re-enforcing member 210 provides the pet toy 100 with the required strength and durability while the rubber-like material allows the pet toy 100 to be flexible, chewable, stretchable, water impervious, soft, light weight, and yet rigid enough to maintain its shape.

Figure 3:
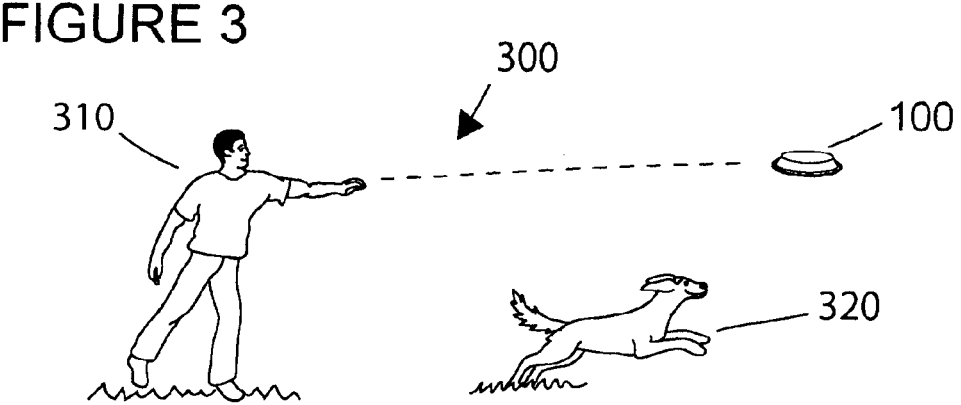
FIG. 3 is a perspective view showing a multi-purpose pet toy in accordance with the preferred embodiment being thrown by a person.

The shape and composition of the pet toy 100 provide it with several unique features and advantages. Referring to FIG. 3, the pet toy's 100 saucer-like shape and light weight allow it to be used in throwing games 300 with pets. In such throwing games 300, a person 310 may throw the pet toy 100, with its convex outer side 140 facing up, to a pet 320 or to a location from where the pet 320 may fetch the pet toy and return it to the person 310. The person 310 may throw the pet toy 100 by grasping said toy with the thumb on the convex side 140, with the assistance of the annularly depressed trough 160, and with one or more fingers on the concave side 150. The throwing may be accomplished with a wrist snapping motion typically used in throwing a flying disk or FRISBEE™ throw toy.

Figure 4:
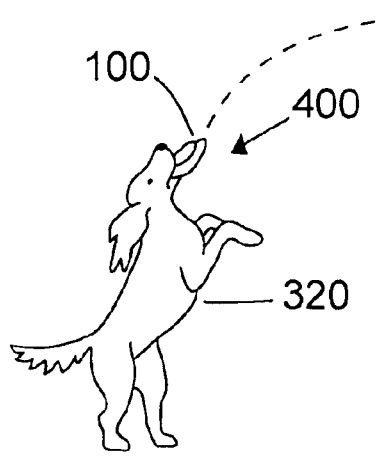
FIG. 4 is a perspective view showing a multi-purpose pet toy in accordance with the preferred embodiment being caught by a pet.
Figure 5:
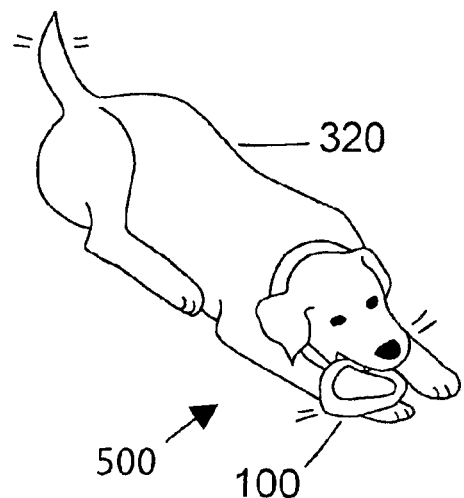
FIG. 5 is a perspective view showing a multi-purpose pet toy in accordance with the preferred embodiment being chewed by a pet.
Figure 6:
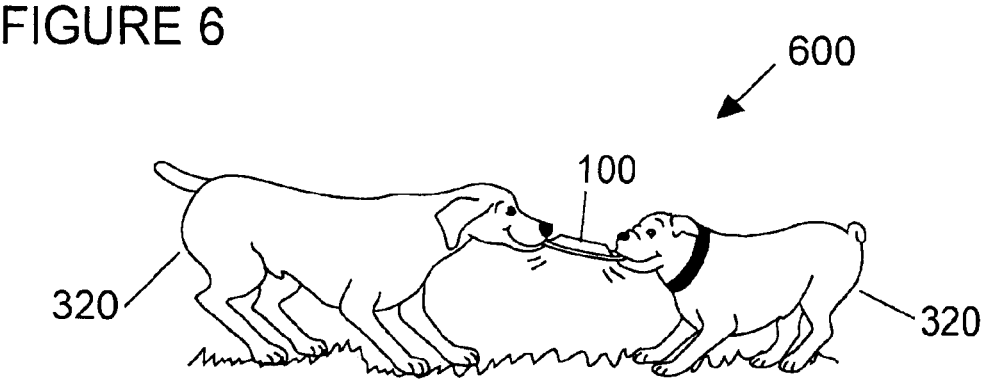
FIG. 6 is a perspective view showing a multi-purpose pet toy in accordance with the preferred embodiment being tugged at by several pets.
Figure 7:
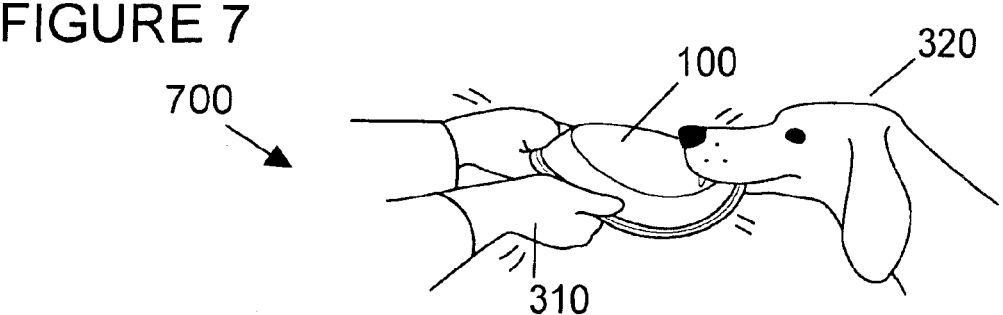
FIG. 7 is a perspective view showing a multi-purpose pet toy in accordance with the preferred embodiment being tugged at by a pet and a person.
Figure 8:
FIG. 8 is a perspective view showing a multi-purpose pet toy in accordance with the preferred embodiment being used as a water and food dish for a pet.

Referring to FIG. 4, the pet 320 may catch 400 the pet toy 100 in its jaws. The soft and flexible nature of the pet toy 100 allows the pet 320 to safely catch the pet toy 100 in its jaws. This soft and flexible nature, along with the pet toy's 100 chewable property, allow the pet 320 to chew the pet toy 100 without harm to the pet's 320 mouth. It is well known that chew toys having these properties are beneficial to a pet's oral health. FIG. 5 shows a pet 320 chewing 500 on the pet toy 100. In addition, the stretchable property of the pet toy 100 allows it to be used in tugging games. FIG. 6 illustrates several pets 320 tugging 600 on the pet toy 100 while FIG. 7 shows a pet 320 and a person 310 playing a tugging game 700 with the pet toy 100. Furthermore, and referring to FIG. 8, the water impervious, deep bowl-like shape, and flat top portion 110 of the pet toy 100, allow it to be used, with its concave side 150 up, as an effective water or food dish 800 for a pet 320. Hence, the pet toy 100 may be used as a flying disk or fetch toy 300, 400, a chew toy 500, a tug-o-war toy 600, 700, or as an effective water or food dish 800.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A multipurpose disc useful as a throwing, tugging, and chewing toy for play and exercise involving pets and for play and exercise involving pets and people, and useful as a water and food dish for pets, the disc comprising:

(a) a circular top portion;
   (b) an annular sidewall portion that merges with said circular top portion;
   (c) an annular flange portion that merges with said annular sidewall portion, said annular flange portion and said circular top portions being disposed in parallel spaced planes, said annular flange portion presenting an outer annular rim, said thread fabric being centrally and symmetrically disposed within said top, sidewall and flange portions of the disc, and said thread fabric extending to the very end of the rim,
   (d) a convex outer side; and,
   (e) a concave inner side
   (f) thread fabric continuously disposed within said top, sidewall and flange portions for reinforcing said disc;
   (g) said top, sidewall and flange portions are comprised of a resilient material for chewing by said pets.

2. The multipurpose disc as described in claim 1 wherein said top portion is flat and said annular flange portion has an annularly depressed trough formed where said annular flange portion merges with said annular sidewall portion on said convex outer side.

3. The multipurpose disc as described in claim 2 wherein said top, sidewall and flange portions are comprised of rubber.

4. The multipurpose disc described in claim 3 wherein said thread fabric is composed of flexible woven fabric.

5. The multipurpose disc as described in claim 1 wherein resilient material is waterproof, durable, and flexible.

6. The multipurpose disc as described in claim 5 comprising natural or synthetic rubber.

7. A disc toy for a pet comprising a top portion presenting an annular sidewall portion depending and diverging away from said top portion so as to present a conical surface, and an annular flange portion merging with said annular sidewall portion, said flange and top portions lying in substantially parallel spaced planes, said annular flange portion presenting an annular outer rim, said top, annular sidewall and annular flange portions comprising rubber for chewing by said pet, and thread fabric being continuously centrally and symmetrically disposed within said top, sidewall and flange portions of said disc, and said thread fabric extending to the very end of said rim for reinforcing said disc toy, when said toy is tugged and chewed by said pet, said toy capable of being thrown.

8. A disc toy as claimed in claim 7 wherein said toy is capable of being chewed and tugged by said pet without harming the mouth of the pet.

9. A disc toy as claimed in claim 8 wherein said flange portion has an annular depressed trough adapted to be grasped by a user for throwing said toy.

10. A disc toy as claimed in claim 7 wherein said thread fabric is disposed centrally between substantially equal thicknesses of said top, sidewalls and flange portions.

11. A multipurpose disc as claimed in claim 6 wherein said disc is vulcanized rubber capable of being chewed and thrown.

12. A multipurpose disc as claimed in claim 11 wherein said thread fabric permits bonding of said rubber to resist stretching and tearing when chewed and tugged by said pet.

13. A disc toy as claimed in claim 7 wherein said disc toy is flexible and foldable yet sufficiently rigid to maintain it's shape.

14. A disc for a pet comprising:
  (a) a circular top portion:
  (b) an annular sidewall portion depending and diverging away from said top portion so as to present a conical portion;
  (c) an annular flange portion merging with said annular sidewall portion, said annular flange portion presenting an annular outer rim;
  (d) said flange and top portions lying in substantially parallel spaced planes;
  (e) said top annular sidewall and annular flange portions comprising resilient material for chewing and tugging by said pet without harming the mouth of the pet,
  (f) thread fabric disposed within said top, annular sidewall and annular flange portions of said disc, and said thread fabric being centrally and symmetrically extending to the very end of said rim for reinforcing said disc when chewed and tugged by said pet.

15. A disc as claimed in claim 14 wherein said resilient material is rubber.

16. A disc as claimed in claim 15 wherein said disc is throwable.

17. A disc as claimed in claim 16 wherein said top portion and annular sidewall portion is adapted to retain water and food.

* * * * *